US009516089B1

(12) United States Patent
Ansel et al.

(10) Patent No.: US 9,516,089 B1
(45) Date of Patent: Dec. 6, 2016

(54) IDENTIFYING AND PROCESSING A NUMBER OF FEATURES IDENTIFIED IN A DOCUMENT TO DETERMINE A TYPE OF THE DOCUMENT

(71) Applicant: Locu, Inc., San Francisco, CA (US)

(72) Inventors: Jason Ansel, Cambridge, MA (US); Adam Marcus, Cambridge, MA (US); Marek Olszewski, San Francisco, CA (US); Keir Mierle, San Francisco, CA (US)

(73) Assignee: Locu, Inc., San Francisco, CA (US)

( * ) Notice: Subject to any disclaimer, the term of this patent is extended or adjusted under 35 U.S.C. 154(b) by 309 days.

(21) Appl. No.: 14/108,139

(22) Filed: Dec. 16, 2013

Related U.S. Application Data

(63) Continuation-in-part of application No. 13/605,051, filed on Sep. 6, 2012.

(60) Provisional application No. 61/818,713, filed on May 2, 2013.

(51) Int. Cl.
G06F 17/22 (2006.01)
H04L 29/08 (2006.01)

(52) U.S. Cl.
CPC .................... H04L 67/02 (2013.01)

(58) Field of Classification Search
CPC ..................... G06F 17/22; G06F 17/2247
USPC ............................................. 715/234
See application file for complete search history.

(56) References Cited

U.S. PATENT DOCUMENTS

| 5,784,487 A | * | 7/1998 | Cooperman ....... G06K 9/00469 382/112 |
| 5,944,790 A | | 8/1999 | Levy |
| 5,983,351 A | | 11/1999 | Glogau |
| 6,263,352 B1 | | 7/2001 | Cohen |
| 6,313,835 B1 | | 11/2001 | Gever et al. |
| 6,484,149 B1 | | 11/2002 | Jammes et al. |
| 6,493,637 B1 | * | 12/2002 | Steeg ................. G06F 17/2715 702/19 |
| 6,601,057 B1 | | 7/2003 | Underwood et al. |
| 6,834,306 B1 | | 12/2004 | Tsimelzon |
| 6,938,205 B1 | | 8/2005 | Hanson et al. |
| 7,062,492 B1 | | 6/2006 | Graham |

(Continued)

FOREIGN PATENT DOCUMENTS

WO    WO03/098370 A2 * 11/2003

OTHER PUBLICATIONS

Tan et al.; Text Retrieval from Document Images based on N-Gram Algorithm; Aug. 2000; PRICAI 2000 Workshop on Text and Web Mining, pp. 1-12.*

(Continued)

Primary Examiner — Andrew Dyer
(74) Attorney, Agent, or Firm — Quarles & Brady LLP

(57) ABSTRACT

A system and method for document classification are presented. An input document is received (e.g., by at least one server communicatively coupled to a network). A plurality of features are identified in the input document. The plurality of features include sequences of text extracted from the input document. A feature vector of the input document is generated based upon the sequences of text, and the feature vector of the input document is compared to each of a plurality of signature vectors to determine a primary type of the input document. The primary type of the input document is stored into a storage system in communication with the at least one server.

14 Claims, 9 Drawing Sheets

(56) References Cited

U.S. PATENT DOCUMENTS

| | | | |
|---|---|---|---|
| 7,111,229 B2 | 9/2006 | Nicholas et al. | |
| 7,191,210 B2 | 3/2007 | Grossman | |
| 7,246,305 B2 | 7/2007 | Batres | |
| 7,475,425 B2 | 1/2009 | Bantz et al. | |
| 7,500,182 B2 | 3/2009 | Kelly | |
| 7,500,183 B2 | 3/2009 | Kelly | |
| 7,680,901 B2 | 3/2010 | Rechterman et al. | |
| 7,730,396 B2* | 6/2010 | Chidlovskii | G06F 17/30914 715/234 |
| 7,788,130 B2 | 8/2010 | Feeley et al. | |
| 7,797,622 B2* | 9/2010 | Déjean | G06F 17/30569 715/230 |
| 7,836,399 B2* | 11/2010 | Gurcan | G06F 17/2247 715/243 |
| 7,840,690 B2 | 11/2010 | Thayer et al. | |
| 7,983,924 B2 | 7/2011 | Garrison | |
| 8,037,168 B2 | 10/2011 | Schneider | |
| 8,356,090 B2 | 1/2013 | Parsons et al. | |
| 8,453,213 B1 | 5/2013 | LeBert | |
| 8,453,214 B1 | 5/2013 | LeBert | |
| 8,453,215 B1 | 5/2013 | LeBert | |
| 8,560,665 B2 | 10/2013 | Parsons et al. | |
| 8,645,391 B1* | 2/2014 | Wong | G06F 17/30908 707/748 |
| 2001/0014868 A1* | 8/2001 | Herz | G06Q 10/0637 705/14.38 |
| 2001/0034646 A1 | 10/2001 | Hoyt et al. | |
| 2002/0143659 A1 | 10/2002 | Keezer et al. | |
| 2002/0194373 A1 | 12/2002 | Choudhry | |
| 2003/0172145 A1 | 9/2003 | Nguyen | |
| 2003/0208578 A1 | 11/2003 | Taraborelli et al. | |
| 2004/0049587 A1 | 3/2004 | Henaff et al. | |
| 2004/0059793 A1 | 3/2004 | Gruber et al. | |
| 2004/0133440 A1 | 7/2004 | Carolan et al. | |
| 2004/0139384 A1* | 7/2004 | Lin | G06F 17/2264 715/261 |
| 2004/0148229 A1 | 7/2004 | Maxwell | |
| 2004/0168066 A1 | 8/2004 | Alden | |
| 2004/0199620 A1 | 10/2004 | Ruiz et al. | |
| 2004/0249978 A1 | 12/2004 | Marappan et al. | |
| 2005/0108325 A1 | 5/2005 | Ponte | |
| 2005/0147950 A1 | 7/2005 | Ortiz et al. | |
| 2005/0240580 A1* | 10/2005 | Zamir | G06F 17/30867 |
| 2005/0246627 A1 | 11/2005 | Sayed | |
| 2006/0174199 A1 | 8/2006 | Soltis et al. | |
| 2006/0200751 A1 | 9/2006 | Underwood et al. | |
| 2007/0046982 A1* | 3/2007 | Hull | G06K 9/00442 358/1.15 |
| 2007/0088713 A1 | 4/2007 | Baxter et al. | |
| 2007/0299682 A1 | 12/2007 | Roth et al. | |
| 2008/0010139 A1 | 1/2008 | Elmer et al. | |
| 2008/0059348 A1 | 3/2008 | Glassman et al. | |
| 2008/0126170 A1 | 5/2008 | Leck et al. | |
| 2008/0270486 A1 | 10/2008 | Hind et al. | |
| 2008/0307339 A1 | 12/2008 | Boro et al. | |
| 2009/0094137 A1 | 4/2009 | Toppenberg et al. | |
| 2009/0094379 A1 | 4/2009 | Lu et al. | |
| 2009/0216577 A1 | 8/2009 | Killebrew | |
| 2009/0222416 A1 | 9/2009 | Tymoshenko et al. | |
| 2009/0327101 A1 | 12/2009 | Sayed | |
| 2009/0327231 A1 | 12/2009 | Zappa et al. | |
| 2010/0042487 A1 | 2/2010 | Barazani | |
| 2010/0042927 A1 | 2/2010 | Kim | |
| 2010/0318558 A1 | 12/2010 | Boothroyd | |
| 2011/0035345 A1 | 2/2011 | Duan et al. | |
| 2011/0035379 A1* | 2/2011 | Chen | G06K 9/6226 707/740 |
| 2012/0296679 A1 | 11/2012 | Im | |
| 2013/0067319 A1 | 3/2013 | Olszewski et al. | |
| 2013/0103803 A1 | 4/2013 | Parsons et al. | |

OTHER PUBLICATIONS

Microsoft Computer Dictionary, 5th Edition, 2002, p. 383.

* cited by examiner

FIG. 2

IDENTIFYING AND PROCESSING A NUMBER OF FEATURES IDENTIFIED IN A DOCUMENT TO DETERMINE A TYPE OF THE DOCUMENT

CROSS REFERENCE TO RELATED APPLICATIONS

This application claims priority to and incorporates by reference U.S. Provisional Patent Application No. 61/818, 713 filed on May 2, 2013 entitled "SYSTEMS AND METHODS FOR AUTOMATED DATA CLASSIFICATION, MANAGEMENT OF CROWD WORKER HIERARCHIES, AND OFFLINE CRAWLING" and is a continuation-in-part of U.S. patent application Ser. No. 13/605,051 filed on Sep. 6, 2012 and entitled "Method and Apparatus for Forming a Structured Document from Unstructured Information."

FIELD OF THE INVENTION

The present invention relates generally to the classification of data and, more particularly, to systems and methods for processing input data using one or more classifiers trained using a body of known-good data.

BACKGROUND OF THE INVENTION

Search engines are the current user interface to the Internet. Users often rely heavily on the ability of search engines to provide relevant results. Semantic search techniques aim to improve upon traditional search algorithms by incorporating semantics (meaning) to produce more relevant search results by understanding search intent and contextual meaning.

It is known to classify documents by their contents, if the contents are structured. Documents are classified with respect to pre-defined classes in a supervised setting, where the documents are first machine annotated, and then finally classified using a combination of supervised and unsupervised learning. Similarly, U.S. Pat. No. 7,756,800 to Chidlovskii teaches a method and system for classifying documents based on instances of various structured elements within them.

However, to enable semantic search for unstructured documents, it can be necessary to have tools that can extract structured data from these documents. Unfortunately, extracting meaning from documents that do not provide annotations is an extremely challenging task. This task is particularly challenging, for example, when extracting semantic information for a company's price list (e.g., a restaurant menu) provided as PDF document or an image. Without semantic annotations, it is difficult to determine which text entries refer to section titles, dish names, descriptions, or specific annotations.

BRIEF DESCRIPTION OF THE DRAWINGS

FIG. 2 is a screen shot showing an example user interface of a tool allowing a restaurant manager to update the restaurant's menu.

DETAILED DESCRIPTION

Figure 1:
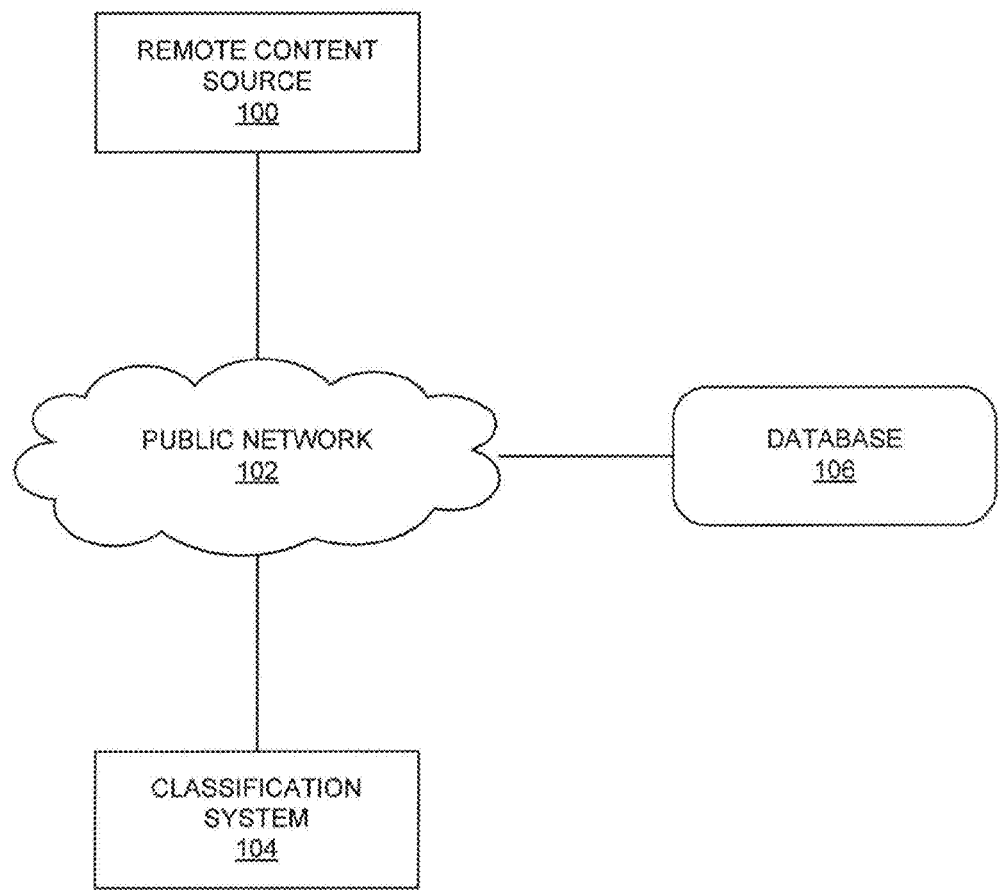
FIG. 1 shows a schematic view of an environment in which an embodiment of the disclosure may operate.

The present invention relates generally to the classification of data and, more particularly, to systems and methods for processing input data using one or more classifiers trained using a body of known-good data.

In one implementation, the present disclosure provides a method including identifying, by at least one server communicatively coupled to a network, a plurality of training tokens. Each training token includes a token retrieved from a content source and a classification of the token. The method includes, for each training token in the plurality of training tokens, identifying, by the at least one server, a plurality of n-gram sequences, generating, by the at least one server, a plurality of features for the plurality of n-gram sequences, and generating, by the at least one server, first training data using the token retrieved from the content source, the plurality of features, and the classification of the token. The method includes training a first classifier with the first training data, and storing, by the at least one server, the first classifier into a storage system in communication with the at least one server.

In another implementation, the present disclosure provides a method including identifying, by at least one server communicatively coupled to a network, a training token including a token retrieved from a content source and a classification of the token, generating, by the at least one server, features for the training token, and training, by the at least one server, a classifier using the token retrieved from the content source, the features for the training token, and the classification. The method includes storing, by the at least one server, the classifier into a storage system in communication with the at least one server.

In another implementation, the present disclosure provides a system including a server computer configured to communicate with a content source using a network. The server computer is configured to identify a plurality of training tokens, each training token including a token retrieved from the content source and a classification of the token, and, for each training token in the plurality of training tokens, identify a plurality of n-gram sequences, generate a plurality of features for the plurality of n-gram sequences, and generate first training data using the token retrieved from the content source, the plurality of features, and the classification of the token. The server computer is configured to train a first classifier with the first training data, and store the first classifier into a storage system in communication with the server computer.

In another implementation, the present disclosure provides a method including receiving, by at least one server communicatively coupled to a network, an input document, and identifying, by the at least one server, a plurality of features in the input document. The plurality of features include sequences of text extracted from the input document. The method includes generating, by the at least one server, a feature vector of the input document based upon the sequences of text, comparing, by the at least one server, the feature vector of the input document to each of a plurality of signature vectors to determine a primary type of the input document, and storing, by the at least one server, the primary type of the input document into a storage system in communication with the at least one server.

In another implementation, the present disclosure provides a method including identifying, by at least one server communicatively coupled to a network, an input document, and determining, by the at least one server, a type of the input document by comparing a plurality of features extracted from the input document to a plurality of signature vectors. Each one of the plurality signature vectors describes a probability that at least one of the plurality of features appears in a price list having a particular type. The method includes storing, by the at least one server, the type of the input document into a storage system in communication with the at least one server.

In another implementation, the present disclosure provides a system including a server computer configured to communicate with a content source using a network. The server computer is configured to receive an input document, and identify a plurality of features in the input document. The plurality of features include sequences of text extracted from the input document. The server computer is configured to generate a feature vector of the input document based upon the sequences of text, compare the feature vector of the input document to each of a plurality of signature vectors to determine a primary type of the input document, and store the primary type of the input document into a storage system.

This description primarily discusses illustrative embodiments as being implemented in conjunction with restaurant menus. It should be noted, however, that discussion of restaurant menus simply is one example of many different types of unstructured data items that can be analyzed in accordance with the illustrative embodiments. For example, various embodiments may apply to unstructured listings from department stores, salons, health clubs, supermarkets, banks, movie theaters, ticket agencies, pharmacies, taxis, and service providers, among other things. Accordingly, discussion of restaurant menus is not intended to limit the various embodiments of the invention discussed herein.

FIG. 1 shows a schematic view of an environment in which an embodiment of the disclosure may operate. The environment includes one or more remote content sources 100 (e.g., a web server) on which is an input document containing data suitable for classification, such as a web page containing a pricing list, such as a menu or listing of available products and/or services. The remote content sources 100 are connected, via a data communication network 102 such as the Internet, to a classification system 104 in accordance with an embodiment of the invention. As described in more detail below, the classification system 104 extracts relevant features or tokens from input documents for analysis and classification. The relevant tokens and classification thereof can be stored in database 106. Database 106 may be connected to classification system 104 through network 102, or may be directly connected to classification system 104.

In various embodiments, the remote content sources 100 may be any conventional computing resource accessible over a public network, such as network 102. Network 102 may be the Internet, or network 102 may be any other data communications network that permits access to the remote content sources 100. The database 106 may be any database or data storage system known in the art that operates according to the descriptions provided herein.

The present system is configured to retrieve content from one or more of the remote content sources 100. The retrieved content is then analyzed to identify a number of tokens that are contained within the content. The token generally include text retrieved from a particular section or segment of the content. The tokens can then be analyzed to identify a particular classification to which the tokens belong. The classification, for example, may denote a particular type of the token, such as a product name, product description, or price. Once classified, the tokens, as well as their classifications, can be stored in a database, such as database 106, for future use.

In one example, the present system may be utilized to assist a restaurant in managing the content of its menu, as well as disseminating the restaurant's menu content to a number of third party hosting providers. In such an example, the present system is configured to crawl the restaurant's website in order to identify menu content stored therein or other sources of menu content. In one implementation this involves crawling accessible remote sources related to the restaurant to obtain one or more lists of uniform resource locators (URLs) of potential menu data sources. Once identified, those URLs can then be used to retrieve the menu content. To automate the process, which in some cases could be performed at least partially manually, illustrative embodiments use a custom distributed web crawler that employs several initial input sources (e.g., GOOGLE, BING, Restaurant lists) to seed its index. The index can then be used to identify suitable sources of menu data. By using publicly available lists and search engine application programming interfaces (APIs), crawling can be focused to a targeted geographically constrained set of web pages, facilitating the ability to efficiently scale menu discovery.

Having identified a list of URLs that identify data sources relevant to the restaurant and potentially containing menu data, the URLs are processed and classified to determine whether the URLs identify content that contains price list or menu data. If a URL identifies a resource containing menu data (a determination that can be made by detecting certain keywords in the resource's content), the content (e.g., web page) is retrieved and processed. This may involve converting multimedia representations of menus (e.g. contained within .pdf files, or in images, video, or animation files) into text using optical character recognition (OCR) to enable the analysis described below. The retrieval of content may involve fetching additional content associated with the URL, including an entire input document, as opposed to just header information.

Once retrieved, the content is processed to identify a number of tokens contained within the content. A token, as used herein, refers to a logical collection of text (e.g. a collection of words) that is contained within a data source, such as a website. Within a web page, for example, a token may be identified as a grouping of words that are contained within a single hyper-text markup language (HTML) tag, such as a <p> tag, <span> tag, and the like. Collections of words that are separated by a <br> tag may be considered two separate tokens or as a single token, depending upon the system implementation. Tokens could be identified by the placement of text on a web page, or the arrangement of text within an image. For example, a grouping of words, numbers, or other symbols that is separated from other words, numbers, or symbols on the web page by a threshold distance may be considered as a token. This approach could be useful if some of the text for the web page has been generated as the result of OCR performed on an image included on the web page. Generally, any suitable algorithms or approaches to identify tokens within a content source can be used to extract the token.

Having identified a number of tokens in the relevant content, the present system is configured to process each token in order to determine a classification for each of the tokens. When analyzing menu content, for example, each token identified within the menu content may be classified as a menu title, section or sub-section name, section description, item name, item description, item price, or item option. Depending upon the type of content being analyzed, the classifications could change. When analyzing pricing information for a mechanic, for example, the classifications may include services offered, service descriptions, prices, part names, and part descriptions, for example. The potential classifications for the identified tokens would vary based upon the type of content being analyzed.

Figure 2:
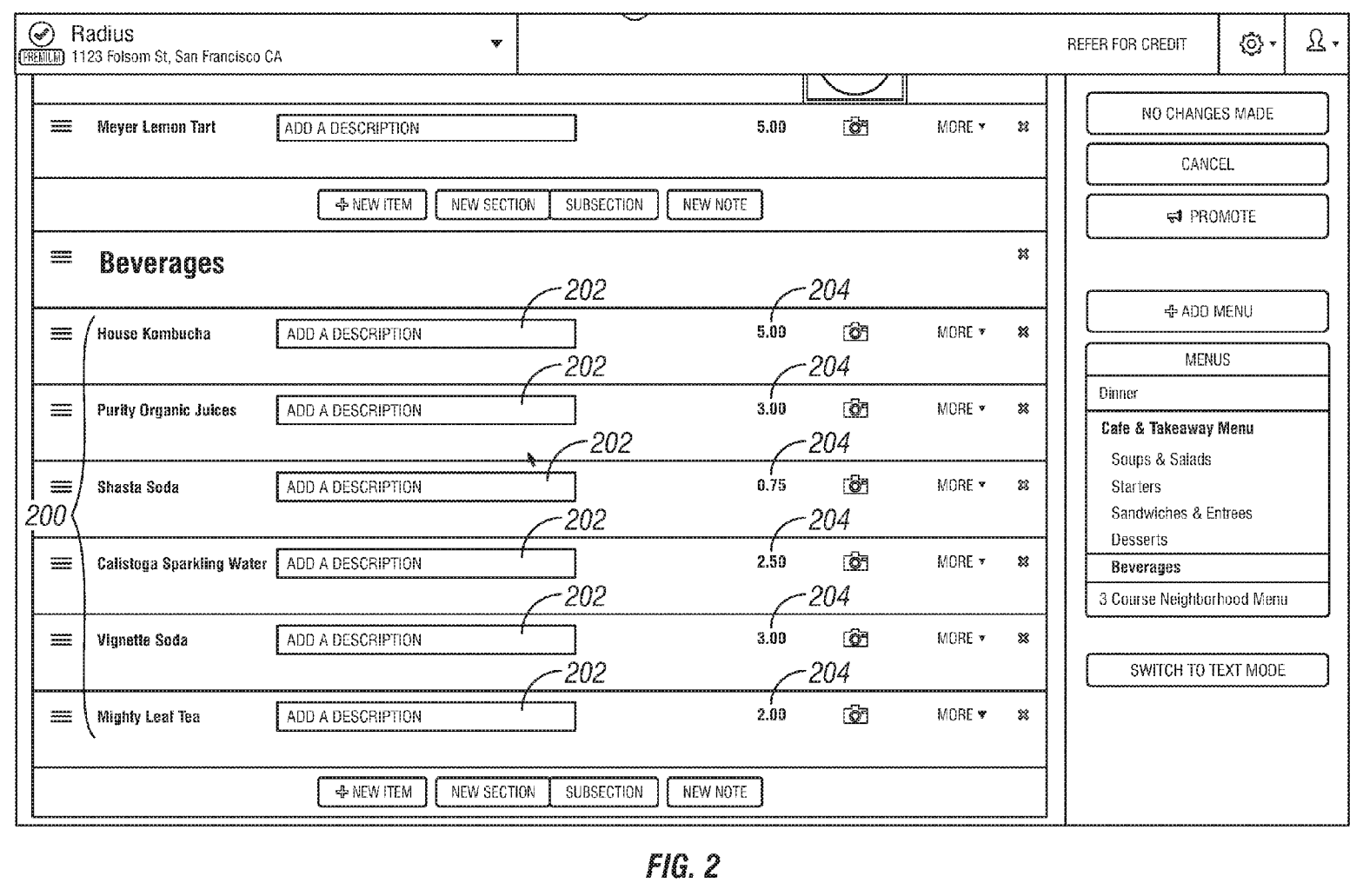

Once the tokens have been classified, the tokens, as well as their classifications, can be stored in a database for future use. In the case of restaurant data, the database of tokens and classifications can be used to assist a restaurant owner or manager keeping the menu up-to-date. For example, using the database, a software management tool can be provided to the restaurant manager (or another other user) to easily add new menu items, modify item descriptions, update pricing, and otherwise change the content of the menu by modifying the tokens and classifications stored in the database and by adding or removing tokens. FIG. 2, for example, is a screen shot showing an example user interface of a tool allowing a restaurant manager to update the restaurant's menu.

Referring to FIG. 2, the depicted user interface includes a listing of beverages 200 for a particular restaurant's menu. The name of each beverage may be stored in the database with a classification of "item name". The user interface enables the user to add a description 202 for each beverage, which would be stored in the database as tokens with the classification of "item description". Each item is also associated with a price 204, which may also be stored in database as a token having a classification of "item price".

In addition to updating the menu's listing of beverages, the user interface may also allow the user to create or edit sections of the menu, and create new lists of items with relevant descriptions, prices, and options.

As such, the user interface illustrated in FIG. 2, in combination with the database of tokens and associated classifications, enables a user to easily manage and update a menu.

After the user has finished editing and/or revising the menu, the new menu can be published to a number of different locations. For example, the system may be configured to publish the updated menu back to the restaurant's website. In that case, the restaurant owner may provide the system with authorization credentials enabling the system to access and modify the restaurant's web site (e.g., a username and password for an administration interface or file transfer protocol (FTP) account). Alternatively, the restaurant owner may insert a widget into his or her website that will cause the owner's website, once visited by a user, to access the present system in order to retrieve the updated menu data.

In either case, the present system may be configured to apply a style template to the menu data stored in the database to render the menu data into a suitable form for publication. The template may define how particular sections of the menu will be displayed by specifying, for example, the layout of the menu, fonts, font styling, and color for different portions of the menu, and any additional graphics, multimedia, or visual markup elements that may be incorporated into the menu. The restaurant owner may be able to select from a number of different templates that may be used in displaying the restaurant's menu. Additionally, the user interface may enable the owner to customize the template or even create new templates. The template data as well as other mark-up information and multimedia may be stored in database 106 or in another suitable repository.

Once rendered and published, the rendered menu can be accessed by users visiting the restaurant's website in order to view the restaurant's selections and browse available items.

In addition to generating a rendered menu that is suitable for display on the restaurant's website, the system can also transmit the restaurant's menu data to third parties for publication via alternative publication mechanisms. For example, the menu data may be transmitted to local business information and review websites, such as YELP, where the menu data can be incorporated into an informational entry for the restaurant. The system may transmit the menu data (along with optional rendering information) to a printing facility that could generate physical menus, pamphlets, fliers, business cards, and the like for the restaurant. All or part of the menu data could be transmitted to one or more social network accounts of the restaurant, such as FACEBOOK, to display, for example, the entire menu or recently update items.

As the owner makes changes to the restaurant's menu using, for example, the user interface of FIG. 2, those changes can automatically be published to both the restaurant's website and any third party publishers. This allows changes to be made to the menu using a single user interface and then those changes can automatically be transmitted to any number of publishers. This would allow the owner, for example, to update the menu's pricing and then have that updated pricing information to be populated in all published versions of the restaurant's menu. Otherwise, the owner would have to access all published versions of the restaurant's menu to make identical changes to each version. This creates a risk of discrepancies arising between published versions of the menu, possibly resulting in customer dissatisfaction due to pricing discrepancies, available selection discrepancies, and the like.

Figure 3:
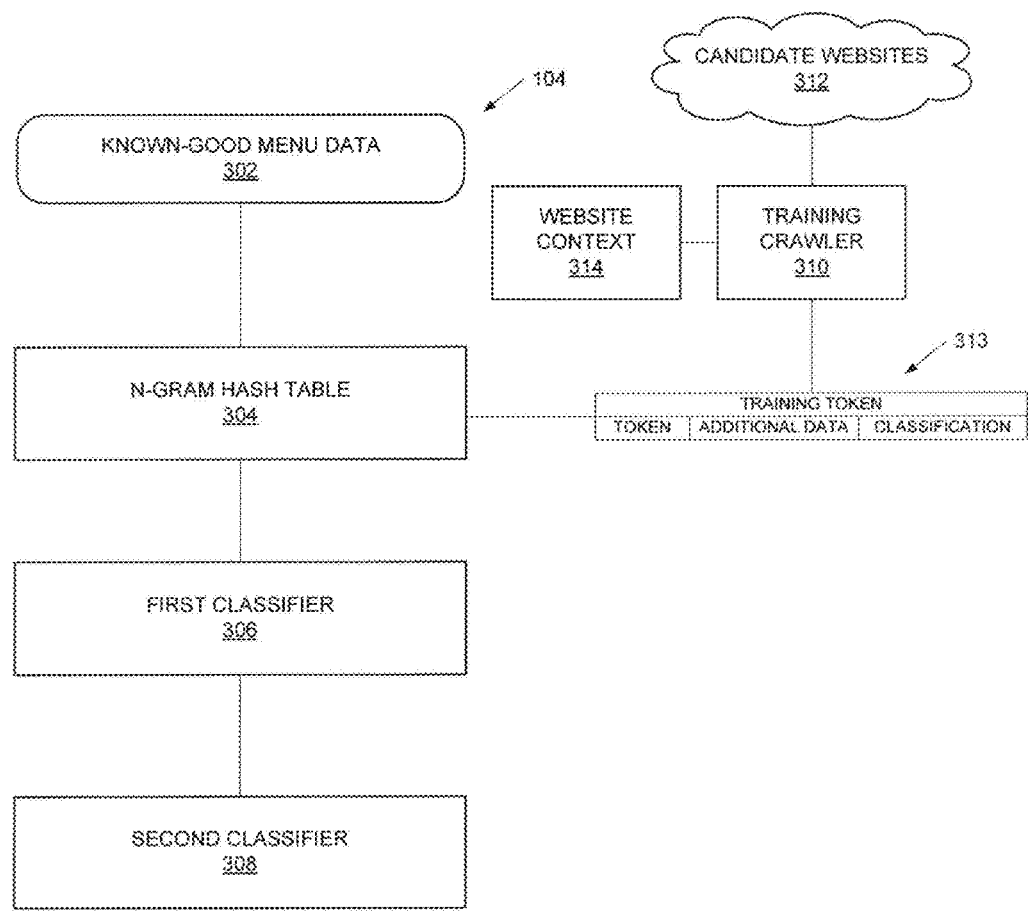
FIG. 3 is a block diagram illustrating functional components of a content classification system, such as classification system 104 of FIG. 1.

FIG. 3 is a block diagram illustrating functional components of a content classification system, such as classification system 104 of FIG. 1.

Classification system 104 includes a database storing known-good menu data 302. Known-good menu data 302 includes, for a number of different websites of restaurants, an identification of tokens that appear on those websites, as well as a classification for each token. For example, in the restaurant menu space, known-good menu data 302 may store, for a number of different menus, a listing of different menu items (classified as 'item_name'), item descriptions (classified as 'item_desc'), section headings (classified as 'section'), item prices (classified as Item_price), and the like. In that case, the known-good menu data 302 stores, for a plurality of menus, a comprehensive listing of the tokens that are found on each of the menus as well as a classification for each token. Known-good menu data 302 may also store other token attributes, such as data or indications describing the visual appearance of the tokens, their placement within a website, and an identification of a web page upon which the tokens appear.

Known-good menu data 302 can be generated by any number of mechanisms, including machine classification systems, where those machine classifications may be human audited or not. Alternatively, the classifications may be generated manually, entirely by human input, with no machine classification being performed. For example, crowd workers may be allocated tasks that involve the analysis and categorization of a relatively large amount of input content (e.g., restaurant menus) in order to construct known-good menu data 302. In some cases, an automated classification system may attempt to perform an initial analysis and classification on a set of input content. The results of the automated system can then be supplied to a number of crowd workers for auditing and, possibly, correction and updating. One example approach for generating the known-good menu data 302 is presented in U.S. Patent Publication 2013/0067319, which describes a method and apparatus for forming a structured document from unstructured information.

The data contained within known-good menu data 302 can be stored in any suitable database having any suitable format. The data may be stored, for example, in a relational database (e.g., PostgreSQL, ORACLE RDBMS, and the like), or as structured data (e.g., in the form of an extensible markup language (XML)) documents.

N-gram hash table 304 stores a number of n-grams as well as usage counts for each n-gram, where the n-grams are derived from the tokens contained within known-good menu data 302. As used herein, an n-gram is collection of n words selected from a sequence of words in a token where the beginning of a particular token and the end of a token can be counted as words in n-grams where n is 2 or greater.

For example, in the token "chicken tikka masala" a number of n-grams may be identified. The token includes the 1-grams "chicken", "tikka", and "masala". The token includes the 2-grams "^ chicken" (where the '^' denotes the beginning of the token), "chicken tikka", "tikka masala", and "masala $" (where the '$' denotes the end of the token. The token includes the 3-grams "^ chicken tikka", "chicken tikka masala", and "tikka masala $". In the present disclosure a number of examples are presented where 1-gram, 2-gram, and 3-gram sequences are used, though other implementations involving different length sequences (e.g., 4-gram and greater) may be used as well.

N-gram hash table 304 is constructed by analyzing the tokens in known-good menu data 302. For each token, 1-gram, 2-gram, and 3-gram sequences are generated. Each n-gram sequence is then stored in n-gram hash table 304 along with a count indicating how often the n-gram sequence has appeared under different classifications. As discussed above, in the case of menu data, the classifications may include menu title, section or sub-section name, section description, item name, item description, item price, or item options. Because the same sequence (e.g., the 2-gram "chicken tikka") could appear in tokens having different classifications (e.g., an item name as well as an item description), n-gram hash table 304 stores a count indicating how often each n-gram sequence appears in different classifications of menu data. To illustrate, Table 1, below, shows sample n-gram hash table 304 data.

TABLE 1

| N-Gram Sequence | Menu | Section | Sub-Section | Section Text | Item Name | Item Desc. | Item Price | Item Option |
|---|---|---|---|---|---|---|---|---|
| Chicken | 400 | 22914 | 5734 | 21661 | 1288456 | 1033933 | 20 | 493165 |
| Tikka | 3 | 92 | 63 | 315 | 41765 | 17501 | 0 | 466 |
| Masala | 6 | 252 | 87 | 348 | 28417 | 12552 | 0 | 1139 |
| ^Chicken | 244 | 15717 | 3896 | 1282 | 580135 | 158257 | 0 | 337997 |
| Chicken Tikka | 1 | 5 | 19 | 128 | 19708 | 10115 | 0 | 2069 |
| Tikka Masala | 0 | 21 | 12 | 31 | 6667 | 977 | 0 | 241 |
| Masala $ | 1 | 73 | 23 | 13 | 18720 | 3352 | 0 | 904 |
| ^Chicken Tikka | 0 | 3 | 14 | 15 | 15728 | 3409 | 0 | 1973 |
| Chicken Tikka Masala | 0 | 1 | 2 | 11 | 3626 | 533 | 0 | 102 |
| Tikka Masala $ | 0 | 12 | 7 | 2 | 5688 | 255 | 0 | 217 |

With reference to Table 1, the first column contains a number of different 1-gram, 2-gram, and 3-gram sequences. For each sequence, the remaining columns contain a count of how many times the sequence has appeared in the available classifications. For example, in the example data the sequence "^ chicken tikka" has appeared in the name of a menu item 15,728 times, and in the name of a section only once. The sequence "Chicken" has appeared in an item description 1,033,933 times, but has only appeared in the name of a menu 400 times. The sequence "Chicken" has appeared in an option to a menu item 493,165 times. The counts may be implemented by incrementing the values in a particular column as each token is analyzed when n-gram hash table 304 is created or new data is added to n-gram hash table 304. In various implementations mechanisms, such as count-min sketch, can be utilized to generate the usage counts for the sequences in n-gram hash table 304.

The n-gram data in n-gram hash table 304 can be stored in any format suitable for storing the sequences and associated usage counts. In some implementations, the sequences may be hashed using an appropriate hashing algorithm and the hash of the sequences can be stored in the sequences column of the n-gram hash table 304, rather than the sequences themselves.

To minimize data storage or provide other performance improvements, the sequences' hashes could be truncated (e.g., by storing only a subset of the characters in the hashed value). Although this could result in potential collisions between sequences whose hashed values share the same subset of characters, various techniques can be used to reduce the detrimental affect of collisions. For example, the effect of collisions could be reduced by creating multiple entries in n-gram hash table 304 for each n-gram sequence, where each entry uses a different hash algorithm. In that case, if 3 different hash algorithms were used, a collision would be likely to only affect a single entry (leaving two-thirds of the entries unaffected). Then, when using the data stored in the n-gram hash table 304, outlier usage counts, which could be the result of collisions between popular sequences, could be ignored.

Classification system 104 includes first classifier 306. First classifier 306 is a token classifier that is configured to generate classification probabilities for a particular token based upon that token's attributes as well as attributes of the web page from which the token was retrieved. First classifier 306 is configured to receive a token as an input. First classifier 306 then processes the token and generates an output, where the output identifies each of the potential classifications for that token as well as a probability that the token belongs to each classification. For example, the token "chicken tikka masala" may be an input to first classifier 306. In response to that input, first classifier 306 may generate the following output: "0%", "0.02%", "0.05%", "0.26%", "85%", "13%", "0%", and "2.4%" where the percentages indicate the probability that "chicken tikka masala" belongs to each of the classifications "menu name", "section name", "sub-section name", "section text", "item name", "item description", "item price", and "item option", respectively.

During operation, first classifier 306 may utilize n-gram hash table 304 to identify a number of features of the inputted token. Additional features may also be defined for the token based upon attributes of the token, such as the font, font size, position on the webpage, word count in the token, and the like. Those features can then be utilized to generate the output of first classifier 306. The process used by first classifier 306 to analyze a token, as well as the process for training the first classifier 306 is described in more detail below and with reference to FIGS. 4 and 6.

Classification system 104 includes second classifier 308. Second classifier 308 is configured to receive a token as an input. Second classifier 308 then processes the token and generates an output, where the output identifies a classification for the inputted token. During operation, second classifier 308 may utilize first classifier 306 to generate a number of features for the inputted token as well as other tokens relevant to the inputted token. Example features, for example, could include the same set of features as generated by first classifier 306, as well as features of other tokens that are nearby the inputted token on the web page, as well as features of other tokens that share some attributes with the inputted token, such as font style or font size. The process used by second classifier 308 to analyze an inputted token, as well as the process for training the second classifier 308 is described in more detail below and with reference to FIGS. 5 and 6.

Both first classifier 306 and second classifier 308 can be implemented as automated classifiers that are trained on a body of known-good data. For example, the classifiers may be implemented using ensemble methods that provide prediction models trained using appropriate learning algorithms. In one implementation, the classifiers are implemented using gradient tree boosting models that can be trained using appropriate training data, as described herein. Once trained, both classifiers can make predictions regarding the likely classification of an inputted token. In order to train both first classifier 306 and second classifier 308, classification system 104 includes training crawler 310, which is configured to generate a body of training data for the classifiers. Training crawler 310 is configured to crawl through a number of candidate websites 312 for which known-good menu data 302 is available. Training crawler 310 then retrieves a number of tokens from those websites. As well as collecting tokens, however, training crawler 310 also retrieves additional information associated with the tokens. The additional information may include any website contextual or metadata 314 describing the token, how the token is displayed on the webpage, or any other information relevant to the token. In one implementation, the additional information for each token may include the token's x,y position coordinates on a web page, the index of the token on the web page, the font and font size of the token, the height of the token, the distance (e.g., x,y coordinate distance) to a predecessor token, the distance (e.g., x,y coordinate distance) to a successor token, the change in orientation of a predecessor token compared to the token being analyzed and distance to the predecessor token, and the change in orientation of a successor token compared to the token being analyzed and distance to the successor token. In other implementations, the training data may be retrieved directly from known good menu data 302.

Once the additional information is collected, training crawler 310 accesses known-good menu data 302 to identify a correct classification of each identified token. Classifications can be assigned to training tokens by matching the training tokens to known good menu data. Matching may be done with a dynamic programming algorithm that finds the correspondence between the two token streams that maximizes the number of match tokens without allowing reordering. Training crawler 310 can then creating a training token 313 that includes the token itself, the retrieved additional information describing the token, and the correct classification of the token. The training token can then be supplied to both first classifier 306 and second classifier 308 to assist in training, as described below. In some implementations, training crawler 310 will also be configured to generate training tokens that are, essentially, junk and do not belong to any of the enumerated classifications. Such tokens may include portions of a restaurant's policy on tipping or the splitting of bills, for example, but can assist in training the classifiers.

When generating a set of training tokens, training crawler 310 can be configured to ensure that the training tokens include a representative set of training data from the source websites. For example, training crawler 310 may only select a particular number of tokens (e.g., 50 tokens per web page) from a particular website. This would prevent a very long menu or multiple-page menu with a large number of items biasing the set of training tokens. Training crawler 310 may also be configured to select tokens randomly from websites so that the training tokens do not only include tokens from the beginning of menus, in which case the training tokens may be biased towards appetizer dishes, for example.

After training crawler 310 has generated a set of training tokens, both first classifier 306 and second classifier 308 can be trained using the training tokens in conjunction with known-good menu data 302

Figure 4:
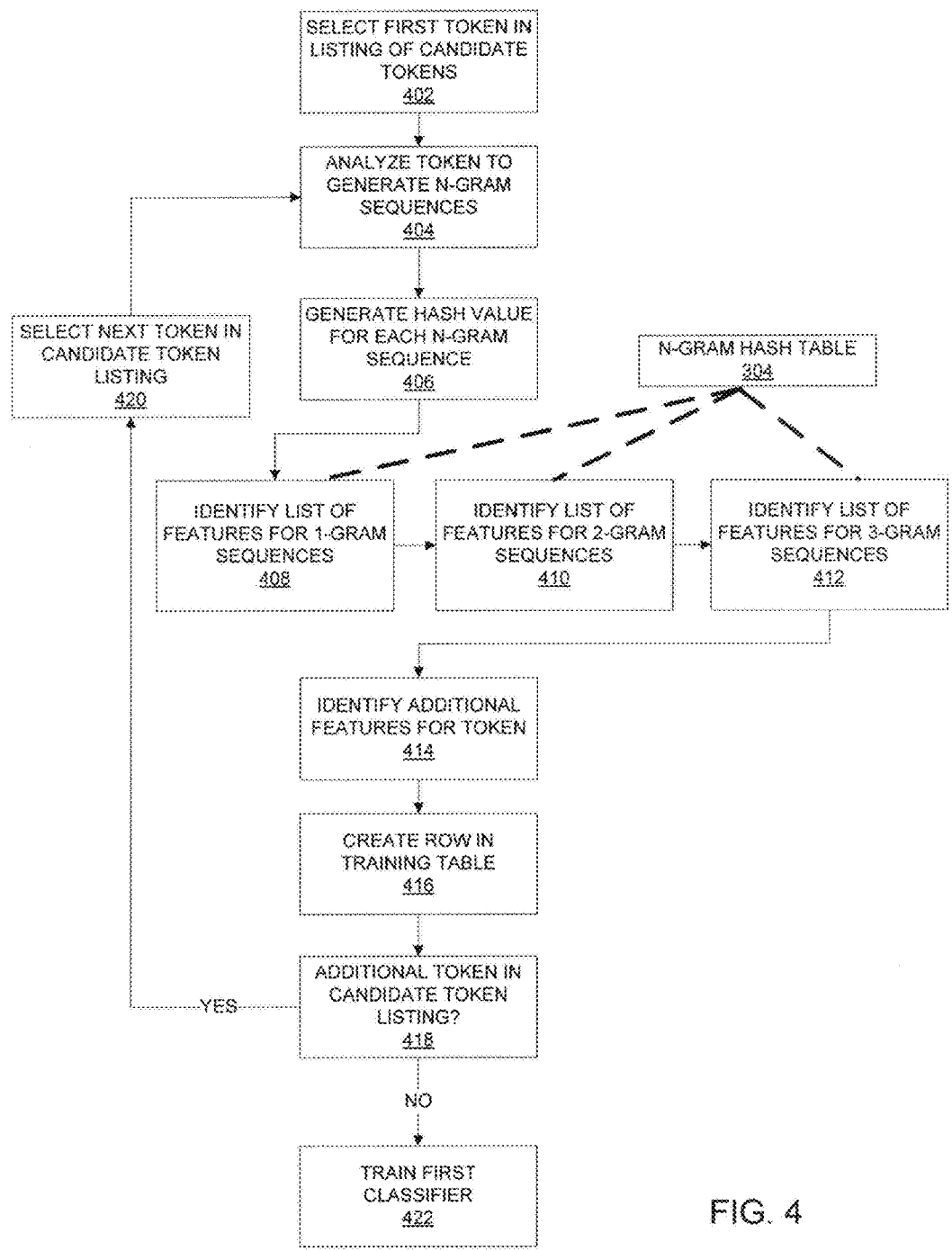
FIG. 4 is a flowchart illustrating a method for training a first classifier using a set of training tokens generated by a training crawler.

FIG. 4 is a flowchart illustrating a method for training first classifier 306 using the set of training tokens generated by training crawler 310. In step 402 a first token is selected from the set of training tokens generated by training crawler 310. In step 404, the token is analyzed to generate a number of 1-gram, 2-gram, and 3-gram sequences (though in other implementations n-gram sequences where n is greater than 3 may be generated).

Once the n-gram sequences are created, in step 406 a hash value is calculated for each n-gram sequence. As discussed above, this may involve executing one or more hashing algorithms to generate one or more hash values for each n-gram sequence. Additionally, once created, the hash values may be truncated so that only a subset of the characters in the calculated hashes is used.

After the hashes have been created, a number of features are identified for the token. Features generally comprise numerical values that describe an attribute of the token or one or more of the n-gram sequences derived from the token. This may involve generating a number of features for each n-gram sequence hash as well as additional features relating to other attributes of the token, such as those relating to how the token is displayed on a particular web page (e.g., position, font size, appearance, etc.).

Accordingly, in step 408 a number of features are identified for the collection of 1-gram sequences. The features can be identified using n-gram hash table 304, described earlier. In one implementation, the usage counts contained in n-gram hash table 304 are retrieved for each 1-gram sequence. The collection of usage counts can then be combined in various ways to generate a number of features for the set of 1-gram sequences. In one implementation, the features for the set of 1-gram sequences will include the average of each usage count across all 1-gram sequences (a single numerical value), the first row of usage count values retrieved from n-gram hash table 304 (8 values corresponding to each potential classification), a row of 8 values corresponding to the mean of each column of usage counts performed without smoothing, a row of 8 values corresponding to the mean of each column of usage counts performed with smoothing, and a row of 8 values corresponding to the geometric mean of each column of usage counts performed with smoothing. Accordingly, for the identified set of 1-gram sequences of the token, a total of 33 features will be identified by inspecting n-gram hash table 304 that correspond to each of the numerical values described above.

In step 410 a number of features are identified for the collection of 2-gram sequences. In one implementation, the usage counts contained in n-gram hash table 304 are retrieved for each 2-gram sequence. The collection of usage counts can then be combined in various ways to generate a number of features for the set of 2-gram sequences. The features for the 2-gram sequences may be the same as those identified for the 1-gram sequences, or different. In one implementation, the features for the set of 2-gram sequences will include the average of each usage count across all 2-gram sequences (a single numerical value), the first row of usage count values retrieved from n-gram hash table 304 (8 values corresponding to each classification), a row of 8 values corresponding to the mean of each column of usage counts performed without smoothing, a row of 8 values corresponding to the mean of each column of usage counts performed with smoothing, and a row of 8 values corresponding to the geometric mean of each column of usage counts performed with smoothing. Accordingly, for the identified set of 2-gram sequences, a total of 33 features will be identified corresponding to each of the numerical values described above.

In step 412 a number of features are identified for the collection of 3-gram sequences. In one implementation, the usage counts contained in n-gram hash table 304 are retrieved for each 3-gram sequence. The collection of usage counts can then be combined in various ways to generate a number of features for the set of 3-gram sequences. The features for the 3-gram sequences may be the same as those identified for the 2-gram or 1-gram sequences, or different. In one implementation, the features for the set of 3-gram sequences will include the average of each usage count across all 3-gram sequences (a single numerical value), the first row of usage count values retrieved from n-gram hash table 304 (8 values corresponding to each classification), a row of 8 values corresponding to the mean of each column of usage counts performed without smoothing, a row of 8 values corresponding to the mean of each column of usage counts performed with smoothing, and a row of 8 values corresponding to the geometric mean of each column of usage counts performed with smoothing. Accordingly, for the identified set of 3-gram sequences, a total of 33 features will be identified corresponding to each of the numerical values described above.

After performing steps 408, 410, and 412, therefore, a total of 99 features have been identified for the token based upon the analysis of the n-gram hash table 304 data for each set of 1-gram, 2-gram, and 3-gram sequences derived from the token. Each feature includes a numerical value that may be equal to one of the usage counts in n-gram hash table 304, or may be an average, sum, or other combination of the usage count values.

In step 414, additional features may be identified for the token. These additional features may be based upon the token itself, the position of the token as it is displayed on a webpage, or attributes of tokens either in proximity to, or on the same web page as, the token being analyzed. In one implementation, the additional features include the normalized word count of the token compared to other tokens on the web page, a raw word count for the token, whether the token matches a number of regular expressions configured to match a price, a normalized x,y coordinate position of the token on the web page, where the top of the web page is specified as position 0.0 and the bottom of the web page is specified as position 1.0, a normalized index of the token on the web page where the first token is assigned index 0.0 and the last token is assigned index 1.0, a normalized font size of the words in the token (a value between 0 and 1) as compared to other tokens on the web page, a normalized height of the token (a value between 0 and 1) compared to other tokens on the web page, the distance (e.g., x,y coordinate distance) to a predecessor token, the distance (e.g., x,y coordinate distance) to a successor token, the change in orientation of a predecessor token compared to the token being analyzed and distance to the predecessor token, and the change in orientation of a successor token compared to the token being analyzed and distance to the successor token.

As such, after performing step 414 an additional set of features for the token have been generated where the features are numerical values.

In step 416, the features calculated in steps 408, 410, 412, and 414 are combined with the original token and the known-good classification for the token in a row of data in a training table. Table 2, illustrating a training table for first classifier 306, is shown below.

TABLE 2

| Token | F1 | F2 | F3 | F4 | F5 | ... | Fn | Classification |
|---|---|---|---|---|---|---|---|---|
| Chicken Tikka Masala | 400 | 22914 | 0.25 | 1 | 78 | ... | 5 | Item Name |
| Ben's Dogs | 0 | 0 | .75 | 3 | 567 | ... | 20 | Menu |
| $0.75 | 0 | 0 | .5 | 8 | 15,758 | ... | 3 | Price |
| $23.75 | 0 | 0 | .65 | 13 | 10,571 | ... | 3 | Price |
| A gratuity of 15% will be added for parties of six or more. | 35 | 15 | .12 | 28 | 36 | ... | 2 | Junk |
| Pizza | 17 | 4 | 573 | 22 | 36 | ... | 7 | Section |

The training table includes a column for the token, a column for the known-good classification of the token, and then a column for each feature (columns F1 through Fn) that was calculated (in some implementations, approximately 119 features may be calculated for each token in training first classifier 306).

In step 418, it is determined whether there are any additional tokens in the candidate listing that need to be processed. If so, the next token in the listing is selected in step 420 and the method returns to step 404 and the process continues analyzing the new token. If, in step 418 it is determined that all tokens in the token listing have been analyzed, first classifier 306 is trained in step 422 using the training table. The training process can include using techniques such as stochastic gradient boosting, random forests, linear discriminant analysis (LDA), singular value decomposition (SVD), K-nearest neighbors, and the like, performed against the training table, to train first classifier 306. Generally, the classifiers are trained via a supervised learning process executed against the set of training data. This will involve the classifier continually refining its own statistical models as new training data is provided. In essence, the classifier attempts to construct a function or mapping from the features of the training data to the known-good classifications that can then be used to classify unknown tokens based upon a set of input features. Once trained, first classifier 306 is configured to receive a token as input and then generate an output that identifies each of the potential classifications for that token as well as a probability that the token belongs to each classification.

Figure 5:
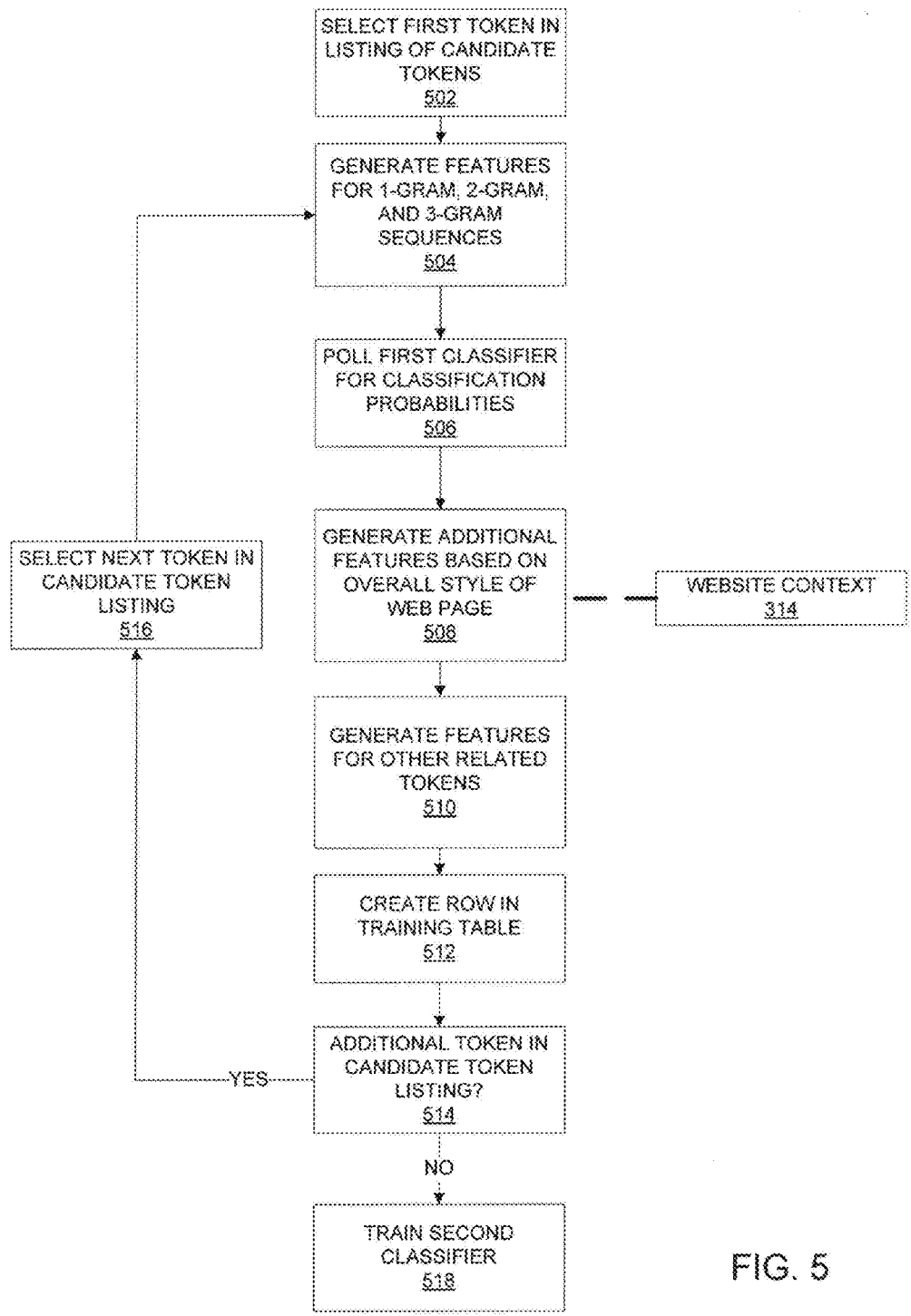
FIG. 5 is a flowchart illustrating a method for training a second classifier using a set of training tokens generated by a training crawler.

FIG. 5 is a flowchart illustrating a method for training second classifier 308 using the set of training tokens generated by training crawler 310.

In step 502 the token is analyzed to generate sets of 1-gram, 2-gram, and 3-gram sequences. A set of features is then generated for each set of n-grams. In one implementation, the set of features is the same as the set of features generated in steps 408, 410, and 412 of FIG. 4. This may involve recalculating or re-generating the features or duplicating the values that were created when training first classifier 306. After step 504, a number of features are generated using first classifier 306.

For example, in step 506 the token being analyzed is inputted into first classifier 306 to generate a set of 8 classification probabilities corresponding to the probabilities, as determined by first classifier 306, that the token falls into each of the 8 potential classifications. Those 8 classification probabilities then become features.

In step 508, features can be defined based upon the percentage of the webpage that shares the same stylistic appearance (e.g., the same font style, font size, font background color, font mark-up, background color, and the like) with the token. This determination may be made using the additional website context data captured by training crawler 310, as discussed above.

In step 510, a number of additional features can be generated that are derived from the classification probabilities of other, related, tokens selected from the same web page. The additional features may include, for each of the three tokens preceding and the three tokens succeeding the token being analyzed, sets of 8 classification probabilities corresponding to the probabilities, as determined by first classifier 306, that the tokens falls into each of the 8 potential classifications. Additional features can be generated by determining the averages and standard deviations of the classification probabilities for the preceding and following 4 tokens, the preceding and following 8 tokens, all tokens on the webpage with the same visual or stylistic appearance (e.g., sharing one or more of font size, font style, color, etc.), and all tokens on the same webpage.

In step 512, the features calculated in steps 506, 508, and 510 are combined with the original token and the known-good classification for the token in a row of a training table (see, Table 2, above, for an example training table). The training table includes a column for the token, a column for the known-good classification of the token, and then a column for each feature that was calculated.

In step 514, it is determined whether there are any additional tokens in the candidate listing that need to be processed. If so, the next token in the listing is selected in step 516 and the method returns to step 504 and the process continues analyzing the new token. If, in step 514 it is determined that all tokens in the token listing have been analyzed, second classifier 308 is trained in step 518. Second classifier 308 is trained using the training table created using the method of FIG. 5. The training can include using techniques such as stochastic gradient boosting, random forest training algorithms, and the like, performed against the training table, to train second classifier 308. Once trained, second classifier 308 is configured to receive a token as input and then generate an output that identifies each of the potential classifications for that token as well as a probability that the token belongs to each classification.

Figure 6:
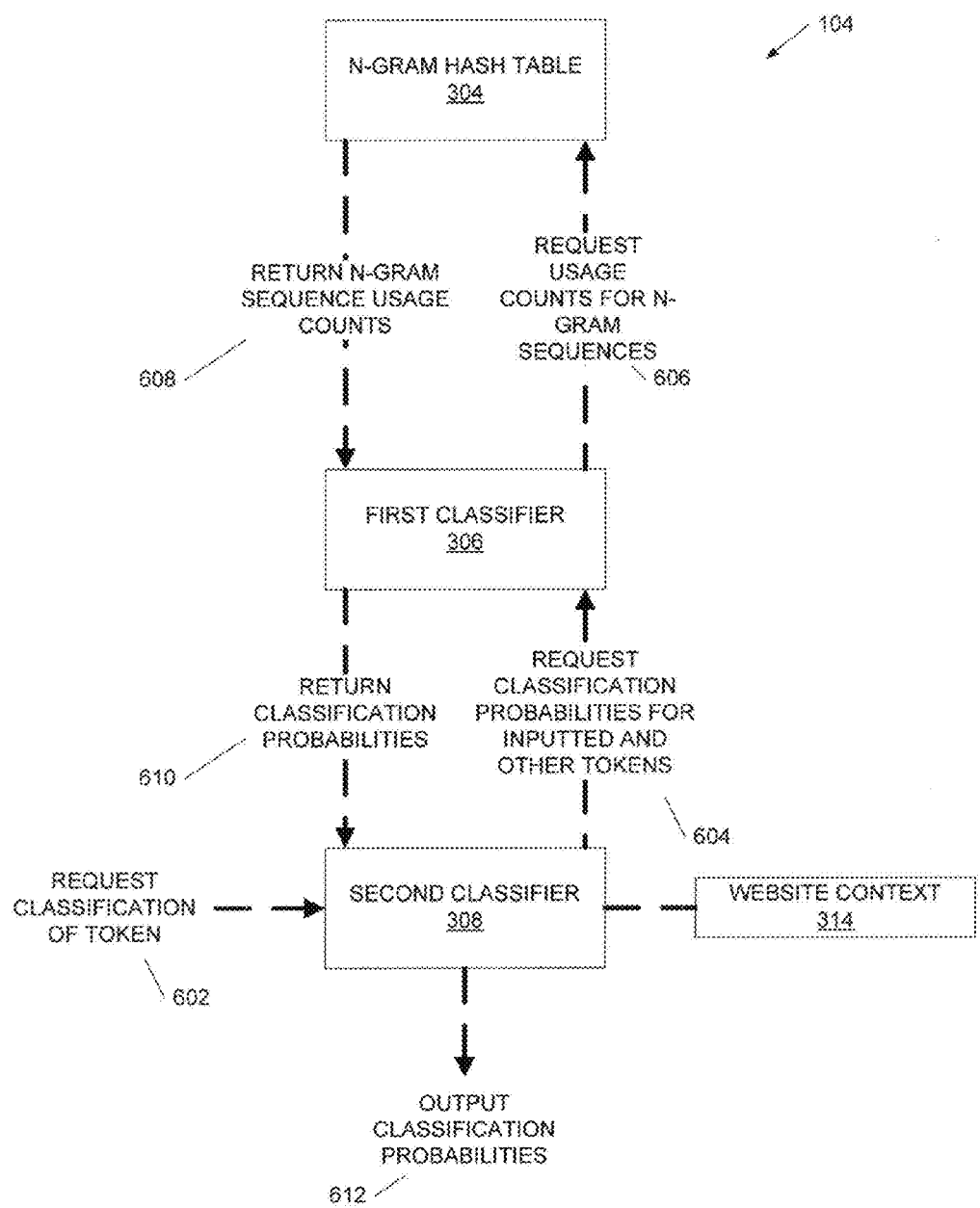
FIG. 6 is a diagram illustrating a process by which a classification system generates classification probabilities for a token.

After first classifier 306 and second classifier 308 are trained (e.g., using the methods illustrated in FIGS. 4 and 5 and described above), classification system 104 can be utilized to generate classification probabilities for new, unclassified, tokens. FIG. 6 is a diagram illustrating a process by which classification system 104 generates classification probabilities for a token.

In a first step 602, an unclassified token is inputted to second classifier 308. The token may be selected from, for example, a restaurant's menu or another type of business' price list or from any other source of content containing token that are to be classified. Upon receipt of the token, second classifier 308 generates a number of features for the token. In one implementation, the set of generated features matches the features that were used to train second classifier 308 (see, for example, the features generated during steps 506, 508, 510, and 512 of FIG. 5). As such, second classifier 308 may calculate a number of features based upon the n-gram sequences of the token, as well as features based upon other tokens contained within the web page or content source being analyzed. The other tokens may be those in proximity to the token being analyzed or tokens that share features, such as stylization (e.g., font size, font style, etc.), or all tokens on the webpage, for example.

In generating the list of features for the inputted token, second classifier 308 relies upon first classifier 306 to generate a number of those features. As indicated by step 604, therefore, while constructing the feature list, second classifier 308 may transmit a number of requests to first classifier 306 for classification probabilities for the token at issue, as well other classification probabilities for tokens or groups of tokens that appear on the web page that may also be used to generate features.

In order to generate the classification probabilities, first classifier 306 generates a set of features for the received token. As discussed above, this may involve computing a number of n-gram sequences for the received token. Additional features may be generated based upon visual attributes of the token on the web page (e.g., font styling, position on the web page, position and/or orientation with respect to other tokens on the webpage, etc.). In one implementation, the set of features generated by first classifier 306 matches the features that were used to train first classifier 306 (see, for example, the features generated during steps 408, 410, 412, 414, and 416 of FIG. 4). In creating the set of features, first classifier 306 accesses n-gram hash table to identify features for the n-gram sequences derived from the received token, as illustrated by steps 606 and 608.

Having generated the set of features for the received token, first classifier 306 uses the model created during training (e.g., created using the method illustrated in FIG. 4)

to generate classification probabilities for the token. The classification probabilities are then be returned to second classifier 308 in step 610.

Second classifier 308 uses the classification probabilities received from first classifier 306 to construct the features for the token being analyzed. Second classifier 308 then uses the model created during training (e.g., created using the method illustrated in FIG. 5) to generate classification probabilities for the token being analyzed. The classification probabilities can then be outputted by second classifier 308 in step 612 and used by an external system to assign the token a particular classification (e.g., the classification having the highest probability in the classification probabilities). Once classified, the token can be inserted into a suitable database for access by a user interface enabling modification of the token, such as the user interface illustrated in FIG. 2. Additionally, the token, once classified (e.g., as indicated by the classification having the highest probability in the classification probabilities) can be re-inserted into known-good menu data 302 where the token may be used in constructing new training data for other classifications.

In addition to classifying particular tokens that may appear, for example, upon a business' price list (e.g., a restaurant's website or menu), it is also useful to be able to determine an overall type of a particular content source, such as a business's pricing list. In the case of restaurant menus, for example, this may involve determine the type of cuisine (e.g., Thai, Chinese, breakfast, etc.). In the case of a mechanic's price list, this may involve determining a type of mechanic (e.g., automotive, marine, etc.). The present system, however, may be used to determine a type of any other form of content. For example, the techniques described below could be used to determine a genre of a piece of writing, a type of a piece of political writing (e.g., whether the writing more conservative or liberal), the type of a particular technical article (e.g., the type of technology being discussed by the article), and the like.

As in the classification of tokens, described above, the contents of a number of business' pricing lists having known types can be used to construct a learning classifier that can then be used to determine a type of new pricing lists. The classifier operates on the knowledge that price lists belonging to businesses of the same type, will tend to feature some similar terms or phrases that tend to not be found on the price lists of other types of businesses.

In the present implementation, a number of pricing lists for a number of different types of businesses or venues are analyzed to generate collections of terms or phrases that are associated with particular business types. Generally, the association of particular terms or phrases with particular business types is based upon the frequency with which those terms or phrases are found in the respective business' price lists. By analyzing a large number of price lists for each business type, it is possible to create a collection of terms or phrases that serve as a form of signature for a particular business type. Upon receiving a new price list that has not yet been allocated to a particular business type, it is then possible to analyze the content of the unknown price list, and then compare that content to the predetermined signatures. The signature that most closely matches the terminology found in the new price list can then be used to allocate a business type to the price list with some confidence.

In one implementation, the signatures are constructed as vectors having a large number of dimensions, where each dimension represents a term or phrase (in one implementation, a 2-gram sequence) and the magnitude of the dimension represents the frequency with which the word appears. A similar vector with the same dimensions is then constructed for the price list being analyzed, where the magnitude of each dimension is a count of how often each term or phrase appears. The vector for the price list being analyzed can then be compared to each of the signature vectors to determine the type of the price list.

Figure 7:
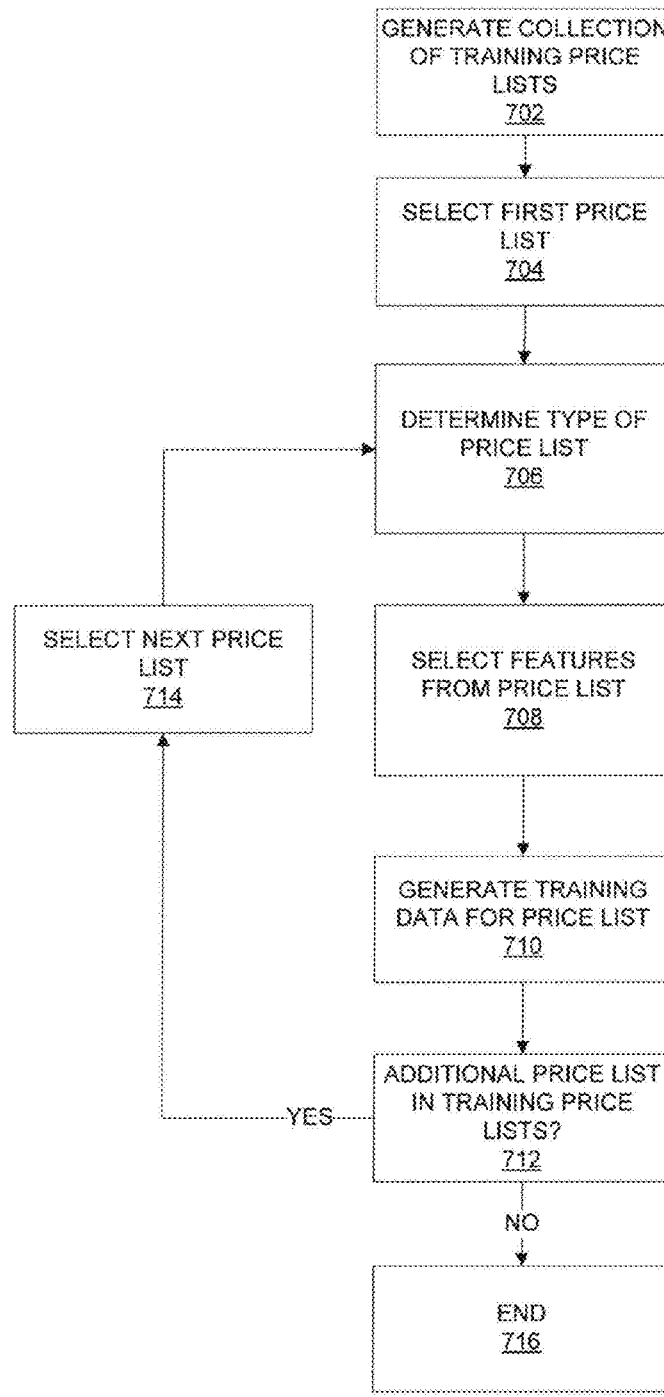
FIG. 7 is a flow chart illustrating a method for generating training data for a price list classifier.

FIG. 7 is a flow chart illustrating a method for generating training data for a price list classifier. In step 702 a collection of price lists for different business is generated. In one implementation, the price lists are identified by a crawler (e.g., training crawler 310 of FIG. 3) that is configured to search through a large number of websites belonging to business where the websites include price lists. The price lists can be identified by detecting particular keywords on one or more web page of the website, or particular keywords in one or more URLs of the website. The price lists may be found on one or more web page of a business' website, in which case the text of the price list can be retrieved directly. In some cases, the price list may be included in the website in the form of an image or multimedia file, in which case the image or multimedia file may be converted into text (e.g., using OCR) before the price list content can be retrieved.

In general, the collection of training price lists will include price lists from several different types of businesses or venues. In the example of restaurant menus, for example, the collection of price lists will include menus from restaurants serving many different types of cuisine. Other sources of potential price lists may include physical menus that can be collected directly from restaurants (whose content can be retrieved by scanning the menus or transcribing the content manually), restaurants' entries on third party publish sites such as YELP, or TRIPADVISOR, for example, and the like. An alternative source for the price list data could be, for example, known-good menu data 302 described above. Additionally, the classification information generated by the second classifier (see step 612) may also be used to generate source price list data. In some cases, known good menu data 302, the output of the second classifier, and additional menu data may be used to construct a set of training pricing lists.

When generating the collection of training price lists, the price lists may be filtered before being incorporated into the training collection. For example, duplicate price lists may be filtered from the training collection. Additionally, price lists that are too long or too short may also be removed from the training collection.

After the collection of training price lists is identified, in step 704 a first price list is selected from the collection of training price lists. In step 706 a type is determined for the price list. When creating the training data, the type can be allocated to the price list by any suitable method. In some cases, the training data is created entirely manually, in which case an individual reviews each price list and manually selects a particular type for the price list. In some cases, this process may be automated, in which case an alternative classification system attempts to allocate each menu a type. In such a case, the alternative classification system may not be particularly accurate and may require some manual verification or validation.

In step 708, a number of features are selected from the price list. Features may include tokens of text (e.g., menu items), numbers, or other content selected from the price list as well as n-gram sequences of those tokens. In one implementation, the features include a number of 2-gram features generated by analyzing the content of the price list.

The features can be filtered using any appropriate criteria to provide that the selected features are those that are useful in identifying a type of the price list. The selection of features may be done by hand, so that an individual or collection of individuals (e.g., crowd workers) manually select features that are likely to reflect the type of price list being analyzed. In some cases, some automated processes, such as principle component analysis (PCA), can also be used to assist in selecting an appropriate set of features. As such, words that are not particularly useful in classification like "the", "a", and "and" may be filtered from the features. These may be referred to as stop words and can be filtered from all price list data. Additionally, words that tend to be found on all price lists (and therefore do not assist much in determining a type of the price list) can also be removed from the price list data. Example words include "tax", "terms & conditions", "gratuity", "directions", and "hours."

After filtering the features retrieved from the price list, training data for the price list can be generated in step 710. The training data for a price list includes the list of features that were selected from the price list as well as the type that was determined in step 706.

In step 712 a determination is made as to whether there are additional price lists to be processed. If so, in step 714 the next price list is selected from the training price lists and the method repeats. If no, in step 716 the method ends.

As such, at the completion of the method illustrated in FIG. 7, training data has been generated that includes, for each price list in the set of training price lists, as set of features as well as a price list type.

Figure 8:
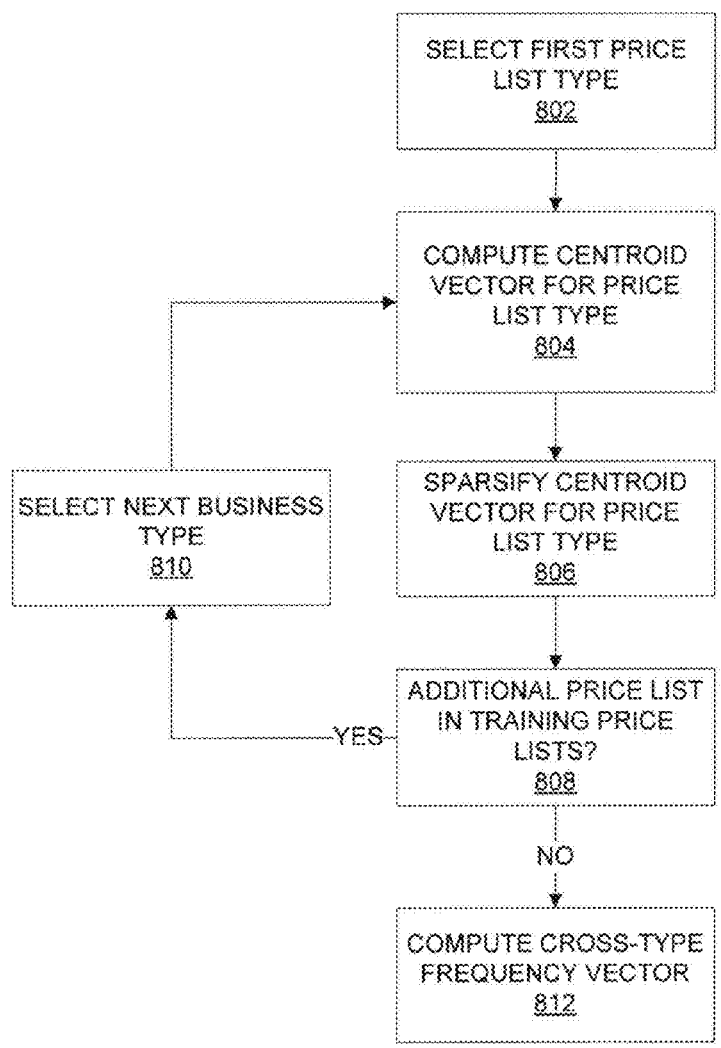
FIG. 8 is a flow chart illustrating a method for generating a price list classifier.

Having generated the training data, FIG. 8 is a flow chart illustrating a method for generating a price list classifier. The method is performed on the training data generated using the method of FIG. 7.

As discussed above, the training data includes training data for a number of different price list types. In step 802, a first one of the price list types in the training data is selected for processing. In step 804, for the first price list type a centroid vector is calculated. The centroid vector for a particular price list type is a vector that includes a dimension for each feature identified in the training data. The magnitude of each dimension indicates how often the relevant feature appears in price lists of that type. For example, if one of the dimensions in the centroid vector represents the feature "pepperoni pizza." The magnitude of that dimension in the centroid vector for pizza restaurants would be greater than the same dimension in the centroid vector for Korean restaurants.

In one implementation, the centroid vector may be constructed as a row in a table where the table includes a column for each feature identified in the training data across all price lists and price list type. Each row in the table represents the centroid vector for a particular price list type. To generate the values that will populate the rows in the table, for the current price list type, the number of times each feature appears for the price list type in the training data is summed up and divided by the total number of price lists in the training data that belong to the current price list type. Accordingly, for each feature, the percentage of times that feature appears in price lists belonging to the current price list type is determined. That information can then be entered into the table to form the centroid vector for that price list type. To illustrate, Table 3, shows the centroid vectors (i.e., rows) for a number of different price list types in the menu space.

TABLE 3

| Price List Type | Chicken Tikka | BBQ Sauce | Pepperoni Pizza | Diet Coke | With Chicken | ... |
|---|---|---|---|---|---|---|
| Pizza Restaurant | .09 | .57 | .93 | .87 | .68 | ... |
| Indian Restaurant | .98 | .21 | 0 | .67 | .65 | ... |
| Burger Place | 0 | .84 | .13 | .71 | .60 | ... |
| Coffee Shop | .12 | .20 | .08 | .61 | 0 | ... |
| Breakfast | 0 | .22 | .02 | .63 | .12 | ... |
| Ice-Cream Shop | .02 | .07 | .03 | .74 | 0 | ... |

After creating the centroid vector for each price list type in the training data, in an optional step 806, the centroid vectors can be sparsified. This step may involve removing (i.e., setting to a percentage of 0.0) any element whose probability falls below a particular threshold. For example, with reference to Table 3, the entries could be sparsified by replacing values that are less than 0.1 with 0. The threshold for sparsification can be selected manually, or automatically, depending upon the system implementation.

In step 808 a determination is made as to whether there are additional price list types that are still to be analyzed within the training data. If so, in step 810 the next price list type is identified and the method repeats. If not, in step 812 a cross-type frequency vector is calculated using the centroid vectors generated in step 806 and 808. The cross-type frequency vector identifies, for each feature in the set of centroid vectors (i.e., for each column in Table 3), a sum of the number of price list types the feature appears. Accordingly, with reference to Table 3, the cross-type frequency vector would be {4, 6, 5, 5, 4, . . . }.

At the conclusion of the method FIG. 8, therefore, a centroid vector (referred to herein as $C_t$) has been calculated for each price list type (t) in the training data and a cross-type frequency vector (referred to herein as D) has been calculated using the centroid vectors.

Figure 9:
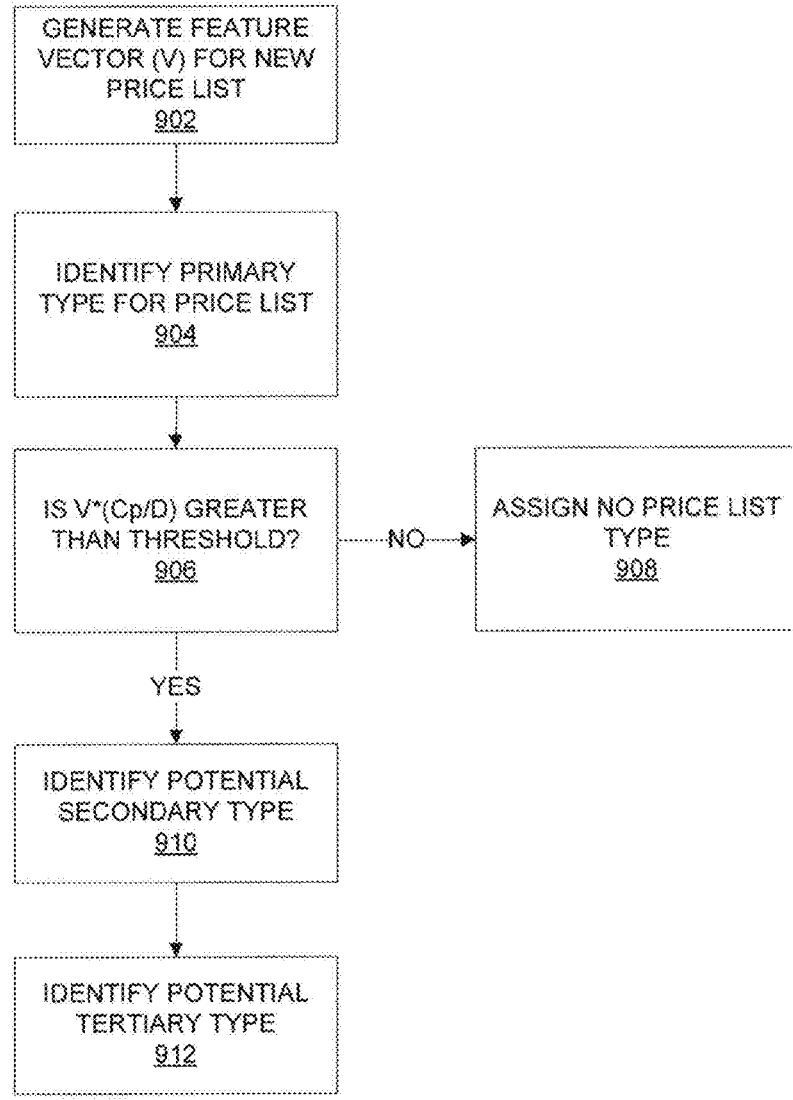
FIG. 9 is a flowchart illustrating a method for calculating a type of a price list using centroid vectors and a cross-type frequency vector.

Having calculated both centroid vectors $C_t$ (i.e., signature vectors) for each type and cross-type frequency vector D, it is possible to use the signature vectors to calculate a type of a new price list. FIG. 9 is a flowchart illustrating a method for calculating a type of a price list using the centroid vectors and cross-type frequency vector.

In step 902, a feature vector (V) is generated for the new price list. Feature vector V is a vector having dimensions that match those of the centroid vectors $C_t$. Within feature vector V, a particular dimension has a value of '1' if the relevant feature is found within the price list or a value of '0' is the feature is not present. Accordingly, feature vector V may be considered a centroid vector for the price list being analyzed. The content of vector V (and, specifically, the selection of can be filtered by hand, so that an individual or collection of individuals (e.g., crowd workers) manually select features that are likely to reflect the type of price list being analyzed for incorporation into vector V. In some cases, some automated processes, such as principle component analysis (PCA), can also be used to assist in selecting an appropriate set of features for incorporation into feature vector V. In other cases, the construction of feature vector V involves determining whether features that are present within the centroid vectors calculated for each price list type are also included in the price list being analyzed. If so, those features can be incorporated into the feature vector V.

Having calculated the feature vector V for the price list, a primary type for the price list can be calculated in step 904. The primary type can be calculated according to the following equation, where p is the primary type:

$$p = \mathrm{argmax}_t(V \cdot (C_t/D)) \qquad \text{Equation (1)}$$

Having calculated the primary type for the price list, in step 906 a determination is made as to whether the primary type that was calculated using equation (1) should be allocated to the price list. Accordingly, in step 906 a determination is made whether the value of $V \cdot (C_p/D)$ is greater than a particular threshold. If not, then in step 908 no type is assigned to the price list. If so, the primary type (p) is assigned to the price list and in step 910 a potential secondary type is identified for the price list. Here the threshold can be used to require a particular degree of correspondence between the feature vector V of the price list being analyzed and the primary type before the primary type is allocated. The threshold, therefore, can be used to require a certain degree of confidence in the determined primary type being accurate before the primary type is allocated to the price list. The threshold can be adjusted based upon desired system behavior. A lower threshold would result in more primary types being allocated to price lists, even if the confidence in the primary type being accurate is lower. In contrast, a higher threshold may reduce the number of primary types being successfully allocated to price lists, but the confidence in the accuracy of those primary types would be increased.

The secondary type (s) is equal to $\text{argmax}_t(V \cdot (C_s/D))$ with the constraints that s is not equal to p and $V \cdot (C_s/D)$ is greater than $k(V \cdot (C_p/D))$ where k is a constant less than 1.0. k, therefore, serves as a factor enabling the secondary type to have a reduced correspondence to the feature vector V than the primary type. The value of k can be selected using any appropriate selection technique including manual and automated processes. If no type satisfies these conditions, then no secondary type is assigned.

In step 912 a potential tertiary type (t) is identified for the price list. The tertiary type is equal to $\text{argmax}_t(V \cdot (C_t/D))$ with the constraints that t is not equal to p or s and $V \cdot (C_t/D)$ is greater than $k(V \cdot (C_p/D))$. If no type satisfies these conditions, then no tertiary type is assigned.

After executing the method of FIG. 9, therefore, for an input price list a primary classification may have been calculated as well as potential secondary and tertiary classifications. These classifications can then be used by various computer systems that may assist a user in updated and/or revising a price list, where the modification options are selected based upon the determined type of the user's price list. Once determined, the type of price list may also be used to provide a user with assistance in publishing their price list to appropriate publishers, marketing the price list in marketing channels that are appropriate for the type, and the like.

Various embodiments of the present invention may be embodied in many different forms, including, but in no way limited to, computer program logic for use with a processor (e.g., a microprocessor, micro controller, digital signal processor, server computer, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as C, C++, or JAVA) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) in a tangible storage medium, such as a semiconductor memory device (e.g., a RAM, ROM, PROM, EEPROM, or Flash-Programmable memory), a magnetic memory device (e.g., a diskette or fixed disk), an optical memory device (e.g., a CD-ROM), a PC card (e.g., PCMCIA card), or other memory device. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or temporarily in a tangible storage medium, such as a semiconductor memory device (e.g., a RAM, ROM, PROM, EEPROM, or Flash-Programmable memory), a magnetic memory device (e.g., a diskette or fixed disk), an optical memory device (e.g., a CD-ROM), or other memory device. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

The present disclosure describes preferred embodiments with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included are generally set forth as logical flow-chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown. Some embodiments provided for are described as computer-implemented method claims. However, one of ordinary skill in the art would realize that the method steps may be embodied as computer code and the computer code could be placed on a tangible, non-transitory computer readable medium defining a computer program product.

Although the above discussion discloses various exemplary embodiments of the invention, it should be apparent that those skilled in the art can make various modifications that will achieve some of the advantages of the invention without departing from the true scope of the invention.

The invention claimed is:

1. A method, comprising:
    receiving, by at least one server communicatively coupled to a network, an input document;
    identifying, by the at least one server, a plurality of features in the input document, the plurality of features including sequences of text extracted from the input document;
    generating, by the at least one server, a feature vector of the input document based upon the sequences of text;
    identifying, by the at least one server, a plurality of signature vectors based upon an input training dataset and at least one cross-type frequency vector;
    comparing, by the at least one server, the feature vector of the input document to each of a plurality of signature vectors to determine a primary type of the input document, wherein comparing the feature vector of the input document to each of the plurality of signature vectors to determine the primary type of the input document includes identifying a signature vector that maximizes the expression $V \cdot (C_t/D)$, where V is the feature vector, $C_t$ is a signature vector t in the plurality of signature vectors, and D is the at least one cross-type frequency vector; and
    storing, by the at least one server, the primary type of the input document into a storage system in communication with the at least one server.

2. The method of claim 1, wherein the plurality of features includes two-gram sequences.

3. The method of claim 1, including:
    identifying a first signature vector in the plurality of signature vectors of the primary type of the input document; and
    determining whether $(V \cdot (C_p/D))$, where $C_p$ is the first signature vector of the primary type of the input document, exceeds a threshold.

4. The method of claim 3, including, when $(V \cdot (C_p/D))$ exceeds the threshold, comparing, by the at least one server, the feature vector to at least one of the plurality of signature vectors to determine a second type of the input document.

5. The method of claim 1, wherein the input document includes a price list of a business.

6. The method of claim 5, wherein each one of the plurality signature vectors describes a probability that at least one of the plurality of features appears in a price list having a particular type.

7. The method of claim 1, wherein the input document is a web page.

8. A system, comprising:
    a server computer configured to communicate with a content source using a network, the server computer being configured to:
    receive an input document,
    identify a plurality of features in the input document, the plurality of features including sequences of text extracted from the input document,
    generate a feature vector of the input document based upon the sequences of text,
    identify a plurality of signature vectors based upon an input training dataset and at least one cross-type frequency vector,
    compare the feature vector of the input document to each of a plurality of signature vectors to determine a primary type of the input document wherein comparing the feature vector of the input document to each of the plurality of signature vectors to determine the primary type of the input document includes identifying a signature vector that maximizes the expression $V \cdot (C_t/D)$, where V is the feature vector, $C_t$ is a signature vector t in the plurality of signature vectors, and D is the at least one cross-type frequency vector, and
    store the primary type of the input document into a storage system.

9. The system of claim 8, wherein the plurality of features includes two-gram sequences.

10. The system of claim 8, wherein the server computer is configured to:
    identify a first signature vector in the plurality of signature vectors of the primary type of the input document; and
    determine whether $(V \cdot (C_p/D))$, where $C_p$ is the first signature vector of the primary type of the input document, exceeds a threshold.

11. The system of claim 10, wherein the server computer is configured to, when $(V \cdot (C_p/D))$ exceeds the threshold, compare the feature vector to at least one of the plurality of signature vectors to determine a second type of the input document.

12. The system of claim 8, wherein the input document includes a price list of a business.

13. The system of claim 12, wherein each one of the plurality signature vectors describes a probability that at least one of the plurality of features appears in a price list having a particular type.

14. The system of claim 8, wherein the input document is a web page.

* * * * *